No. 891,057. PATENTED JUNE 16, 1908.
E. GERWIG.
CAR FENDER AND ATTACHMENT.
APPLICATION FILED FEB. 26, 1908.
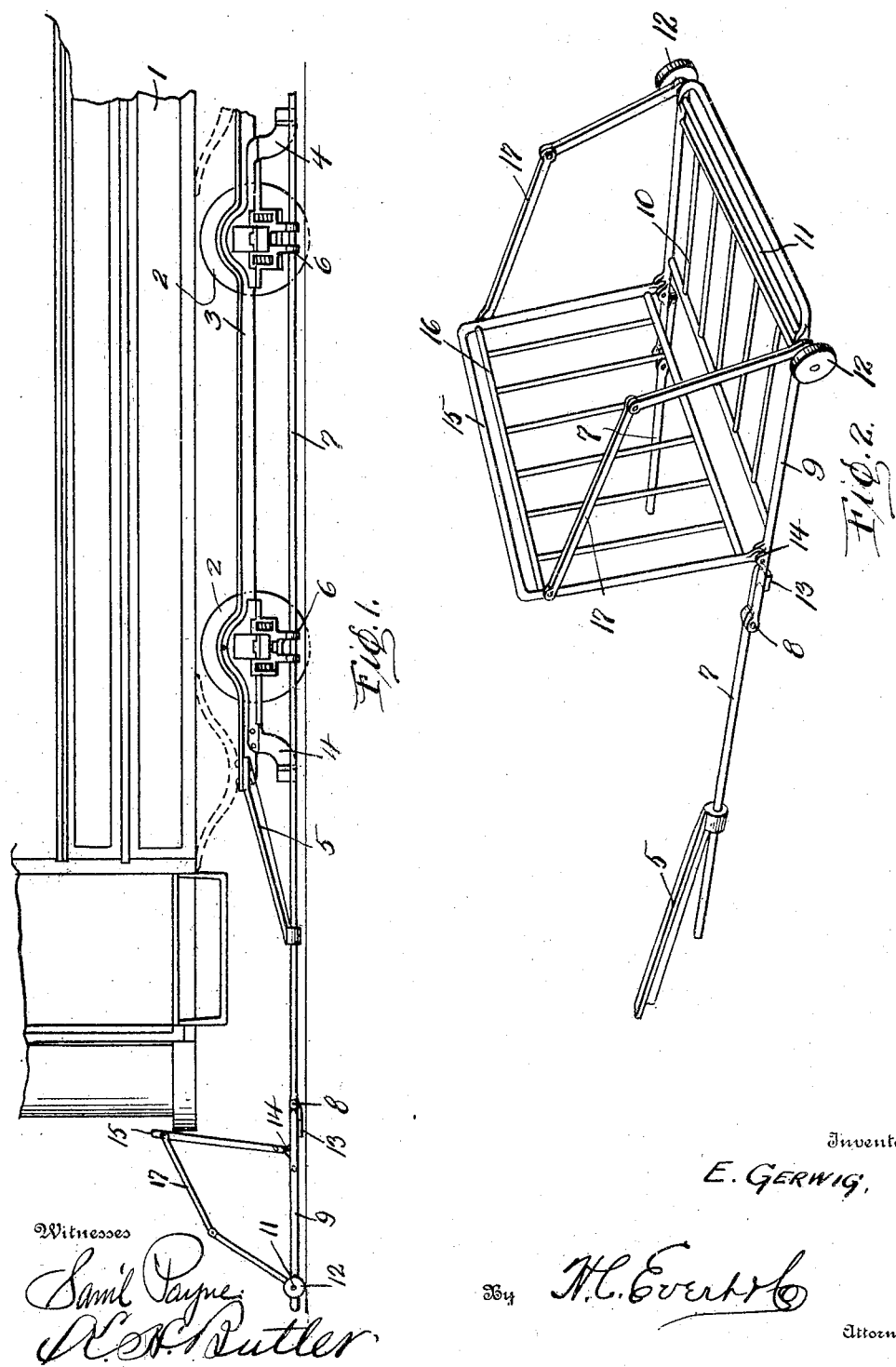
Inventor
E. GERWIG,
Witnesses
Sam'l Payne
N. A. Butler
By N. C. Everts
Attorneys

UNITED STATES PATENT OFFICE.

EMIL GERWIG, OF PITTSBURG, PENNSYLVANIA, ASSIGNOR OF ONE-FOURTH TO JOSEPH HEARN, OF PITTSBURG, PENNSYLVANIA.

CAR-FENDER AND ATTACHMENT

No. 891,057.      Specification of Letters Patent.      Patented June 16, 1908.

Application filed February 26, 1908. Serial No. 417,883.

*To all whom it may concern:*

Be it known that I, EMIL GERWIG, a citizen of the United States of America, residing at Pittsburg, in the county of Allegheny and State of Pennsylvania, have invented certain new and useful Improvements in Car-Fenders and Attachments, of which the following is a specification, reference being had therein to the accompanying drawing.

This invention relates to car fenders, and the objects of my invention are, first, to provide a simple and inexpensive fender that can be used in connection with various kinds of street railway cars; second, to provide novel supports for a fender, which serve functionally as guards, upon the sides of a car; third, to provide a strong and durable fender that can be folded; and fourth, to provide a novel fender that will support and prevent persons from being run down and injured by a car.

I attain these objects by a fender that will be presently described in detail and then specifically pointed out in the appended claims.

Referring to the drawings forming a part of this specification, Figure 1 is a side elevation of a portion of a car equipped with my fender, and Fig. 2 is a perspective view of a fender as detached from a car.

In the accompanying drawings, 1 designates a portion of a car having trucks 2 connected by side frames 3. The ends of these frames are provided with guards 4 and extensions 5, and mounted in said extensions and brackets 6, carried by the trucks 2, are longitudinally disposed rods 7, serving functionally as guards upon the sides of the car 1. The ends of the car are identical in construction, therefore I deem it only necessary to describe my fender as arranged at one of the ends of the car.

Pivotally connected to the rod 7, as at 8, is a U-shaped frame 9 provided with a lattice work or grating 10. Mounted in the forward edge of the frame 9 is an axle 11, and journaled upon the ends of said axle are wheels 12 adapted to travel upon the same track as the car 1. The frame 9 is also supported by lugs 13, carried by the ends of the rods 7.

Pivotally connected to the U-shaped frame 9, as at 14, is a similar frame 15 having a lattice work or grating 16. The upper edge of the frame 15 is connected by pivoted links or arms 17 to the axle 11. When the pivoted links or arms 17 are collapsed, the frame 15 can be folded upon the frame 9, and then both of said frames swung upwardly against the end of the car. The folding of the frames 15 and 9 is essential to permit of two cars being coupled together, without removing the fenders.

It is apparent that should a person be struck by my fender that they will be immediately precipitated upon the frame 9 and will be prevented from falling under the car by the frame 15.

The fender and its supports are constructed of light and durable metal, and I reserve the right to make such alterations in my invention as are permissible by the appended claims.

Having now described my invention what I claim as new, is:—

1. In a car fender, the combination with a car and the side frames thereof, of extensions carried by said side frames, longitudinal rods supported by said extensions, U-shaped frames pivotally connected to the ends of said rods, revoluble wheels carried by said frames, U-shaped frames pivotally connected to the first mentioned frames and adapted to fold thereon, and lattice work carried by said frames, substantially as described.

2. The combination with a car, and the side frames thereof, of extensions, longitudinal rods carried by said extensions, fenders pivotally connected to the ends of said rods, said fenders comprising pivotally connected U-shaped frames adapted to be folded together, and revoluble wheels carried by one of said frames, substantially as described.

3. The combination with a car, of rods arranged at the sides thereof, and extending from one end of the car to the other, fenders pivotally connected to the ends of said rods, said fenders comprising U-shaped frames adapted to be folded together, and means for supporting said frames in an operative position.

In testimony whereof I affix my signature in the presence of two witnesses.

EMIL GERWIG.

Witnesses:
    MAX H. SROLOVITZ,
    C. V. BROOKS.